Patented May 24, 1932

1,860,320

UNITED STATES PATENT OFFICE

BIRGER W. NORDLANDER, OF SCHENECTADY, NEW YORK, ASSIGNOR TO GENERAL ELECTRIC COMPANY, A CORPORATION OF NEW YORK

CHEMICAL PRODUCTS

No Drawing.   Application filed May 14, 1929.   Serial No. 363,099.

This invention relates to a new and useful chemical product and the method of preparing it.

Selenium sulphide may be prepared in stable, chemically active form. In a copending application, Serial No. 350,836, filed March 28, 1929, and in my Patent No. 1,711,742 dated May 7, 1929, I have described such a compound and given methods for its preparation. This compound has the formula $SeS_2$ and contains two double bonded sulphur atoms which are chemically very active. Added to this is the fact that the sulphur is combined with an element in the same periodic group, namely, selenium, which makes it very easy to split off in chemical reaction.

Sulphur has been used both in therapeutics, and as a fungicide because of its formation of compounds with toxic properties. The major problem has been, and is, to get the element in as active form as possible, and also in such condition whereby it may be easily applied.

Because of the properties of selenium sulphide, as noted above, its ease in making an extremely active sulphur available makes it admirably suited where the properties of active sulphur are desired. However, selenium sulphide, as such, is not wetted by water and the obtaining of this compound in a suitable medium for use and where it can be wet by water is highly important, inasmuch as the fungicidal activity of this compound is exhibited principally in the presence of moisture and oxygen.

I have discovered that by combining selenium sulphide with a hydrophilic medium it is possible to obtain this compound in such a state that it can be taken up by water to form either a stable colloidal suspension, or a paste, and I thus obtain a practical product. By the term "hydrophilic medium" or "hydrophilic substance" I mean a medium, or substance, which cooperates with the selenium sulphide and makes it capable of being wet by water. As a hydrophilic medium I may use several substances, among which I mention bentonite, which is a colloidal, hydrophilic clay, fuller's earth, and silica gel. I prefer to use bentonite, and as an example of one method of preparing the product of my invention I mention the following:

Bentonite and selenium sulphide in powdered form are first mixed in any desired proportions. A 50:50 mixture is suitable, though the range may vary considerably, in fact, almost any proportion of selenium sulphide and bentonite may be used. The selenium sulphide should be ground fine; 100 mesh or better is desirable. The mixture is heated in an oven to approximately 125° to 150° C., which is above the fusing point of the selenium sulphide. The selenium sulphide fuses and is taken up by the clay in some sort of adsorbed state. The mass is now cooled to room temperature, and then if necessary is powdered. Grinding to the powdered state is usually necessary when the proportion of selenium sulphide in the mixture is high. The powder is orange-red in color. It is suspended in water to any desired consistency which may vary from a pasty condition to a colloidal suspension.

In the form of a paste this product finds use as a therapeutic agent in the treatment of certain skin diseases, as for example, eczema. This product has been used with marked success in the cure of stubborn cases of eczema of years standing.

In the form of a water suspension it makes an excellent fungicide for the reason that the sulphur present is extremely active chemically and forms, easily, substances which are very toxic in their nature. It may be sprayed on plants, trees, etc., very easily and is extremely effective.

Aside from its use as a fungicide and therapeutic agent, advantage is taken of the active sulphur within this product and a paste is utilized as a protective skin paste. In certain industries a protective skin paste is necessary. For example, where mercury is handled, the problem of keeping mercury from being adsorbed on the hands and of removing it from the skin is important. The use of a thin layer of paste of the product of this invention acts to convert the mercury into protein insoluble and non-toxic mercuric sulphide. This paste can easily be spread out on the skin and after evaporation of the water a thin and very adherent layer remains which cannot be rubbed off without adding water, when it comes off easily. Such a film, therefore, acts in two ways:

(1) By mechanical action prevents mercury from coming in actual contact with the skin.

(2) By chemical action, combines with the mercury to form non-toxic mercury sulphide or selenide.

When made into a paste or salve any suitable base well known in the art may be employed. For example, an excellent salve may be made by using anhydrous lanolin as a base.

As a further illustration of the use of this chemical product may be mentioned its application as a vulcanizing agent in the vulcanization of rubber by sulphur. The product is an excellent medium where sulphur is used in the vulcanization of rubber since in this form the sulphur is very active. The product may be used with or without accelerators and the addition of the filler does no harm as it is an inert substance.

What I claim as new and desire to secure by Letters Patent of the United States, is,—

1. A chemical product comprising a hydrophilic medium and stable, chemically active selenium sulphide.

2. As a new composition of matter a colloidal suspension in water of powdered bentonite containing stable, chemically active selenium sulphide.

3. A therapeutic agent containing stable, chemically active selenium sulphide incorporated with a hydrophilic medium.

4. A skin paste containing stable, chemically active selenium sulphide incorporated with bentonite.

In witness whereof, I have hereunto set my hand this 13th day of May, 1929.

BIRGER W. NORDLANDER.